(12) United States Patent
Walba et al.

(10) Patent No.: US 7,374,948 B2
(45) Date of Patent: May 20, 2008

(54) METHODS AND APPARATUS FOR DETECTION OF MOLECULAR CHIRALITY

(75) Inventors: David M Walba, Boulder, CO (US); Noel A. Clark, Boulder, CO (US)

(73) Assignee: The Regents of the University of Colorado, Boulder, CO (US)

( * ) Notice: Subject to any disclaimer, the term of this patent is extended or adjusted under 35 U.S.C. 154(b) by 402 days.

(21) Appl. No.: 11/141,433

(22) Filed: May 31, 2005

(65) Prior Publication Data

US 2006/0266978 A1    Nov. 30, 2006

(51) Int. Cl.
*G01N 21/62* (2006.01)
*C09K 19/52* (2006.01)
*C09K 19/54* (2006.01)

(52) U.S. Cl. .................. 436/164; 436/149; 436/805; 436/806; 252/299.01; 252/299.5

(58) Field of Classification Search ........... 252/299.01, 252/299.5; 436/149, 164, 805, 806
See application file for complete search history.

(56) References Cited

OTHER PUBLICATIONS

Agarkov et al. (2003) Organic Letters 5(12):2091-2094.
Lochmuller and Ryall (1978) J. of Chromatography 150:511-514.
Mikes et al. (1976) J of Chromatography 122:205-221.
Mikes et al. (1976) J.C.S. Chem. Comm. p. 99-100.
Miller (2004) Acc. Chem. Res. 37:601-610.
Millot et al. (2002) Organic Process Research & Development 6:463-47.
Pirkle et al. (1981).J. Am. Chem. Soc. 103:3964-3966.
Reetz et al. (2000) Chirality 12:479-482.
Reetz. (2000) Angew. Chem.-Int. Edit. 40:284-310.
Reetz et al. (2002) Advanced Synthesis & Catalysis 344:1008-1016.
Reetz and Ruggeberg (2002) Chem. Comm. p. 1428-1429.
Schrader et al. (2002) Can. J. Chem. 80:626-632.
Shen et al. (2001) Isr. J. Chem. 40:313-316.
Stambuli and Hartwig (2003) Current Opinion in Chemical Biology 7:420-426.
Tielmann et al. (2003) Chem.-Eur. J. 9:3882-3887.
Traverse & Snapper (2002) DDT 7:1002-1012.
Whaler and Reymond (2001) Current Opinion in Biotechnology 12:535-544.
Zhu and Anslyn (2004) J. Am. Chem. Soc. 126:3676-3677.

*Primary Examiner*—Shean C Wu
(74) *Attorney, Agent, or Firm*—Merchant & Gould, PC

(57) ABSTRACT

The disclosure provides methods for the determination of the enantiomeric excess of chiral compounds. The methods involve doping a chiral analyte into an achiral liquid crystal host to form a chiral dopant/host liquid crystal mixture. An electro-optic signature of the mixture is then determined and is used to calculate the enantiomeric excess of the chiral analyte. The disclosure also provides systems for performing the disclosed methods of determining enantiomeric excess.

17 Claims, 4 Drawing Sheets

METHODS AND APPARATUS FOR DETECTION OF MOLECULAR CHIRALITY

This work was partially supported by grants from the United States Government through the National Science Foundation (NSF Grant No. DMR0213918). The United States Government may have certain rights in this invention.

FIELD OF THE INVENTION

The disclosure relates to methods of determining the enantiomeric excess of chiral compounds using liquid crystals (LC). The disclosure also relates to systems for the determination of enantiomeric excess of chiral compounds using liquid crystals.

BACKGROUND OF THE INVENTION

Measurement of enantiomeric excess (ee) of chiral organic compounds is an important analytical problem. For example, enantiomerically pure (or highly enriched) organic compounds are important for many applications, including medicinal chemistry and organic materials chemistry. See Stinson, S.C. "Chiral Drugs," Chemical and Engineering News 78: 55-78 (200) and Topics in Stereochemistry, Materials-Chirality, Green et al, Eds.; Wiley, 2003; Vol. 24. In these broad classes of applications the quantitative determination of ee is important. Also, sensitive detection of net chirality in materials of low ee may be important in, e.g. detection of enantioenrichment in samples of extraterrestrial organic compounds.

One particularly important current application of the measurement of ee involves combinatorial asymmetric catalyst development. In this application, a library of chiral catalysts is typically applied to an achiral or racemic substrate, producing a library of enantiomerically enriched products. In order to screen the catalyst library for promising leads, the ee of each member of the product library must be determined. Typically, this is accomplished using chromatography on a chiral stationary phase. See Mikes et al, Journal of Chromatography 122 205-221 (1976); Lochmuller et al, Journal of Chromatography 150: 511-514 (1978); Pirkle et al, J. Am. Chem. Soc. 103: 3964-3966 (1981); Mikes et al, Journal of the Chemical Society-Chemical Communications, 99-100 (1976). However, the chromatographic method is relatively slow, and intrinsically serial in nature, making the determination of ee for a large number samples problematical. While a considerable effort is currently underway in the research community aimed at development of methods for high-throughput measurement of ee, the field of combinatorial asymmetric catalyst development is being seriously hindered due to lack of a method for measurement of ee in tens of thousands of samples in a timely manner. See Reetz et al Chirality 2000, 12, 479-482; Reetz et al, Angew. Chem.-Int. Edit. 2001, 40, 284-310; Shen. et al, Isr. J. Chem. 2001, 41, 313-316; Wahler et al, Current Opinion in Biotechnology 2001, 12, 535-544; Millot et al, Organic Process Research & Development 2002, 6, 463-470; Reetz et al. Advanced Synthesis & Catalysis 2002, 344, 1008-1016; Reetz et al. Chemical Communications 2002, 1428-1429; Schrader et al, Canadian Journal of Chemistry-Revue Canadienne De Chimie 2002, 80, 626-632; Tielmann et al, Chem.-Eur. J. 2003, 9, 3882-3887; Stambuli et al, Current Opinion in Chemical Biology 2003, 7, 420-426; Agarkov et al, Organic Letters 2003, 5, 2091-2094; Traverse & Snapper, Drug Discov. Today 2002, 7, 1002-1012; Miller, Accounts Chem. Res. 2004, 37, 601-610; and Zhu & Anslyn, J. Am. Chem. Soc. 2004, 126, 3676-3677.

SUMMARY OF THE INVENTION

In one aspect, the disclosure provides methods for measuring the enantiomeric excess (ee) of a chiral analyte. The methods involve doping an achiral liquid crystal host material with the chiral analyte to form a dopant/host liquid crystal mixture which possesses a chiral liquid crystal phase. An electro-optic signature of the dopant/host liquid crystal mixture is then determined, and compared with a calibration curve which empirically relates dopant enantiomeric excess to electro-optic signature for the same dopant/host combination. Preferably the dopant/host mixture possesses a chiral de Vries smectic A phase and the chiral electro-optic signature that is determined is electroclinic tilt induced by the electroclinic effect.

In another aspect, the disclosure provides methods for determining the enantiomeric excess (ee) of each of a plurality of samples of a chiral analyte. The methods involve doping an achiral smectic A liquid crystal host material with each sample to form a plurality of dopant/host liquid crystal mixtures each possessing a chiral de Vries smectic A liquid crystal phase. A thin film of each dopant/host liquid crystal mixture is then incorporated into a separate liquid crystal cell in a liquid crystal cell array, and each thin film is aligned so that it adopts the bookshelf geometry. The liquid crystal cell array is then placed between crossed polarizers and an alternating current is applied to the liquid crystal cell array to produce the electroclinic effect in at least some of said dopant/host liquid crystal mixtures. The intensity of light passing through said crossed polarizers and through each of the liquid crystal cells in the liquid crystal cell array is measured as a function of time during the application of the alternating current.

In another aspect, the disclosure provides a system for the determination of the enantiomeric excess (ee) of each of a plurality of samples of a chiral analyte. The system includes a liquid crystal cell array comprised of a plurality of liquid crystal cells. Each liquid crystal cell is physically separated from every other liquid crystal cell, and each liquid crystal cell comprises a thin film of a dopant/host liquid crystal mixture having a chiral de Vries smectic A liquid crystal phase in bookshelf alignment. The dopant comprises a chiral analyte and the host comprises an achiral liquid crystal material. The system further includes a polarizing optical system which is optically coupled to the liquid crystal cell array. The polarizing optical system comprises crossed polarizers and an illumination source which is incident upon the crossed polarizers and the liquid crystal cell array. The system further includes an electronic controller for applying alternating current to said liquid crystal cell array, and also includes a photodetection system for measuring the intensity of light passing through the crossed polarizers and through each of the liquid crystal cells during the application of the alternating current.

DETAILED DESCRIPTION OF THE PREFERRED EMBODIMENTS

Figure 1A:
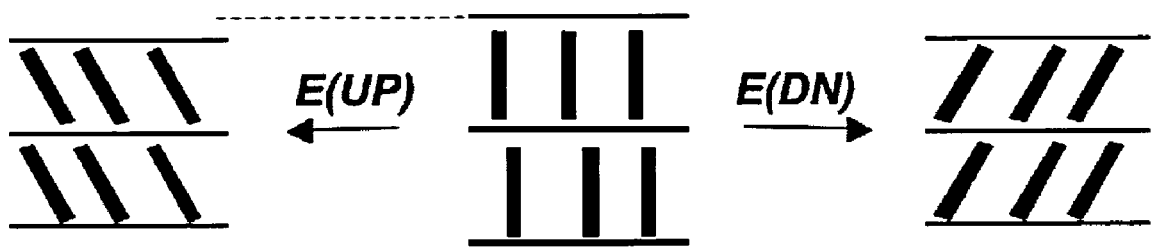
FIG. 1A illustrates schematically the electroclinic effect in a chiral smectic A phase. The director of each molecule is depicted. An electric field is applied parallel to layers (normal to the plane of the page) either E(UP) (i.e. out of the page) or E(DN) (i.e. back into the page) and can be seen to cause the director to tilt.

In the description that follows (including the section entitled "EXAMPLES") all specified quantities and process conditions (including time, temperature, and the like) are examples only and are understood to include a range of equivalents. All such numerical examples are understood to be modified by the term "about," whether or not this is explicitly stated, and the scope of the term "about" is a range of values as could be determined by one of ordinary skill in the art without undue experimentation.

Note that throughout this application, various publications, publications, and patent applications are mentioned; each is incorporated by reference to the same extent as if each was specifically and individually incorporated by reference.

In one aspect, the disclosure provides a method for measuring the enantiomeric excess(ee) of a chiral analyte, which involves doping an achiral smectic liquid crystal (LC) host material with a small amount of the chiral analyte. The resulting dopant/host mixture possesses a chiral liquid crystal phase. The chiral LC phase of the dopant/host mixture possesses a chiral electro-optic or other signature, from which the ee of the chiral analyte dopant may be determined. Determination of the signature in the dopant/host combination, and comparison with a suitable calibration curve empirically relating dopant ee to signature for the same dopant/host combination, then provides the ee of the chiral analyte dopant.

The chiral analyte dopant may be the chiral organic compound of interest itself (or a derivative thereof), or the chiral analyte may comprise a covalent conjugate of the chiral organic compound of interest and an achiral liquid crystal precursor. In the latter case, the chiral analyte dopant is a chiral liquid crystal material, wherein chirality is imparted by the chiral organic compound of interest.

The chiral LC phase of the dopant/host mixture may be a chiral smectic (Sm) A phase (often referred to as the smectic A* or the SmA* phase), a chiral smectic C (often referred to as the smectic C* or the SmC* phase). or other chiral LC phase, such as one of four polar smectic C (SmCP) banana phases (also known as subphases of the B2 banana phase).

The chiral electro-optic signature is determined before any phase separation might occur between the dopant and the host. If phase separation will occur, the measurement should be performed within several hours after the dopant/host mixture is prepared. The basis for determination of chiral electro-optic signatures is well known in the LC art. For example, in one embodiment the ferroelectric polarization of a dopant/host chiral SmC phase (which is known in the art to be a function of the ee of chiral dopants in the phase) may be measured using any technique known in the art. For example, ferroelectric polarization may be measured by first processing the dopant/host mixture into a LC cell comprising a LC thin film between a pair of parallel solid substrates with means for obtaining bookshelf alignment of the liquid crystal (i.e. the LC director is more or less parallel to the substrates with long range orientation of the director in the substrate plane, and the smectic layers are more or less normal to the substrates). When processed in this manner, the thin film forms a surface stabilized ferroelectric liquid crystal (SSFLC) cell. See Clark & Lagerwall, Appl. Phys. Lett. 36:899-901 (1980). As is well known in the SSFLC art, application of an electric field to the substrates causes the LC director to "flip" between two different tilt orientations, with a concomitant change in the orientation of the ferroelectric polarization vector. This change in ferroelectric polarization may be measured directly by monitoring the current passed through the cell during switching, or indirectly by monitoring the electro-optic risetime of the cell (the dynamics of transmission of light through the cell) using standard polarization optics. Measurement of ferroelectric polarization in the dopant/host mixture, and comparison with a calibration curve empirically relating dopant ee to ferroelectric polarization for the same dopant/host combination, provides the ee of the dopant. Suitable achiral liquid crystal host materials that form chiral smectic C phases when doped with a chiral analyte include racemic mixtures of chiral compounds that have a chiral smectic C phase.

Figure 1B:
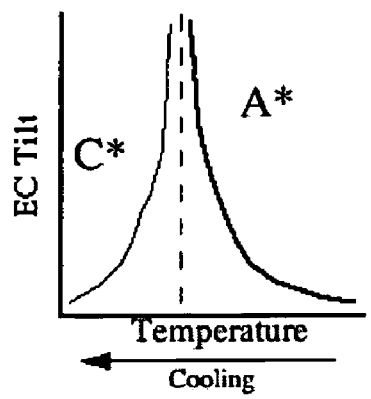
FIG. 1B provides a schematic plot of electroclinic tilt magnitude versus temperature.

In preferred embodiments, the chiral electro-optic signature that is determined is electroclinic tilt produced by the electroclinic effect in dopant/host mixtures having a chiral smectic (Sm) A phase. Electroclinic tilt may be measured by processing the chiral smectic A dopant/host mixture into a LC thin film between a pair of parallel solid substrates with means for obtaining bookshelf alignment of the liquid crystal (i.e. the LC director is parallel to the substrates with long range orientation of the director in the substrate plane, and the smectic layers are normal to the substrates). In the absence of an applied field, the LC director in a chiral smectic A phase in the resulting cell is, on average, oriented normal to the smectic layers (by comparison, the LC director in a chiral smectic C phase in such a cell is tilted relative to the smectic layers in the absence of the applied field). The layer spacing is close to the calculated fully extended molecular length. The chiral smectic A phase is nonpolar (D∞ symmetry), and has no ferroelectric polarization. Application of an electric field parallel to the layers causes a tilt, with concomitant induction of a collective electric polarization, along the applied field. Enantiomers show identical magnitude, but opposite sign of the tilt. The tilted phase is essentially an electric-field induced chiral smectic C phase i.e. a smectic C* phase. This field-induced tilt in the SmA* phase is known in the art as the electroclinic effect and is illustrated schematically in FIG. 1A where an electric field is applied parallel to layers (normal to the plane of the page) either E(UP) (i.e. out of the page) or E(DN) (i.e. back into the page). It can be seen from a plot of electroclinic tilt magnitude versus temperature (FIG. 1B) that the electroclinic tilt magnitude is very small at temperatures far from the SmA-SmC transition ($T_{AC}$), but rises rapidly when the sample is brought close to $T_{AC}$. The electroclinic effect is described in Garoff & Meyer, Phys. Rev. Lett. 1977, 38, 848-851.

The change in optic axis orientation induced by the electroclinic effect may be measured using standard techniques known in the art: for example, by monitoring transmission of light through the cell using standard polarization optics. Measurement of electroclinic tilt induced in the dopant/host mixture by application of a known electric field then provides the ee of the dopant, given a calibration curve empirically relating dopant ee to electroclininc tilt ($f(E)$) for the same dopant/host combination.

Figure 2A:
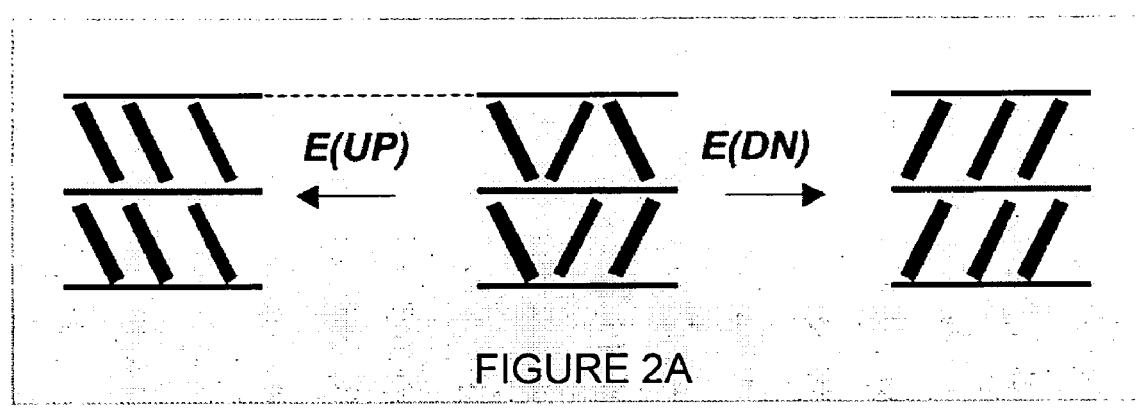
FIG. 2A illustrates schematically the electroclinic effect in a chiral de Vries smectic A phase. The director of each molecule is depicted. An electric field is applied parallel to layers (normal to the plane of the page) either E(UP) (i.e. out of the page) or E(DN) (i.e. back into the page) and can be seen to cause the director to tilt.
Figure 2B:
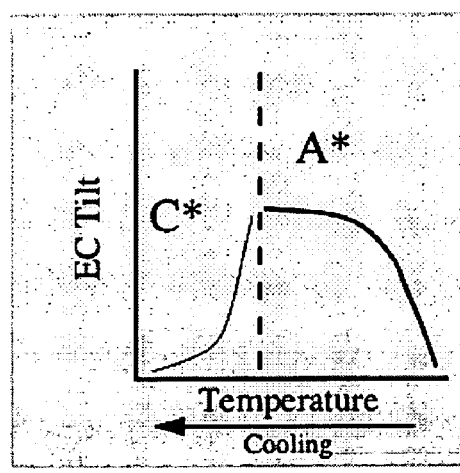
FIG. 2B provides a schematic plot of electroclinic tilt magnitude versus temperature.

In preferred embodiments, the dopant/host mixture has a chiral de Vries smectic A phase above the smectic C phase (or other optically tilted smectic phase). While the structure of the de Vries smectic A phase is not known, the de Vries smectic A phase exhibits a signature change in birefringence with electric field-induced tilt, as described in U.S. Pat. No. 6,870,163, incorporated herein by reference in its entirety. In addition, the layer spacing as a function of tilt shows a signature dependence in the de Vries smectics. Specifically, the layer shrinkage, which occurs upon tilting of the molecular director in a smectic phase, is smaller than expected based upon simple geometrical considerations. Without being bound by theory, one possible model for de Vries behavior may be described as follows. In a de Vries smectic A phase, the LC director for each individual LC molecule is not necessarily oriented normal to the smectic layers. Instead, the long axis of each LC molecule is tilted relative to the layer normal, but the tilt direction is random i.e. there is azimuthal disorder. Because of this azimuthal disorder, the average director of the ensemble of de Vries LC molecules is oriented normal to the smectic layers, thus forming a smectic A phase. Application of an electric field to a chiral de Vries smectic A phase produces an electroclinic effect where the average director tilts away from the layer normal, just as in an the non-deVries case. However, unlike the non-deVries case, electric-field induced director tilting in a chiral deVries smectic A material is accompanied by an increase in azimuthal ordering. This is similar to the model for temperature driven transition from the SmA to the SmC phase described in de Vries, A. *Mol. Cryst. Liq. Cryst* 1977, 41, (2), 27-31. Because a chiral deVries smectic A material is already tilted in the smectic A phase, the electroclinic effect induces little or no change in the layer spacing i.e. there is little or no layer shrinkage. This is illustrated schematically in FIG. 2A where an electric field is applied parallel to layers (normal to the plane of the page) either E(UP) (i.e. out of the page) or E(DN) (i.e. back into the page). A chiral de Vries smectic A material has the following key advantages over non-de Vries chiral smectic A material. First, the magnitude of the tilt observed in response to a given electric field is typically much larger than in the non-de Vries case. Second, the layers do not shrink, or shrink to a lesser extent, than for non-de Vries chiral smectic A materials, avoiding the formation of defects arising from layer shrinkage. Third, the electroclinic effect in a chiral de Vries smectic A liquid crystal phase may be relatively insensitive to temperature. This is illustrated schematically in FIG. 2B by a plot of electroclinic tilt magnitude versus temperature. FIG. 2B illustrates that the electroclinic tilt magnitude declines relatively gradually in comparison to non-deVries SmA phases (compare FIG. 1B) over a wide temperature range above $T_{AC}$.

De Vries smectic A phases are described in Clark et al, Appl. Phys. Lett. 80: 4097-99 (2002), in Shashidhar et al, Advances in Chemical Physics 113:51-76 (2000), and in U.S. Pat. No. 6,870,163, each of which is incorporated herein by reference in its entirety. Examples of materials having a chiral deVries smectic A phase are known in the art. For example, the chiral compounds W399 and W415 are described in Arnett, Mat. Res. Soc. Symp. Proc. 392: 315 (1995) and in U.S. Pat. No. 5,543,978, each of which is incorporated herein by reference in its entirety. The chiral smectic LC (S)-W415 has been shown to exhibit deVries behavior (large surface electroclinic effect, large and relatively temperature independent electroclinic effect, specific type of change in the birefringence with tilt). See Garoff & Meyer, Phys. Rev. Lett. 38, 848-851 (1977)). Other examples of molecules structurally related to W399 and W415 are described in U.S. Pat. Nos. 6,870,163 and 6,870, 163 also provides methods by which one can determine whether a given LC molecule has a chiral de Vries smectic A phase.

Suitable achiral liquid crystal host materials that form chiral de Vries smectic A phase when doped with a chiral analyte include racemic mixtures of chiral compounds that have a chiral deVries smectic A phase. For example, the compound W435 (which is a racemic mixture of (S)-W415 and (R)-W415, described above) is a non-limiting example of an achiral host that may be doped with a chiral analyte:

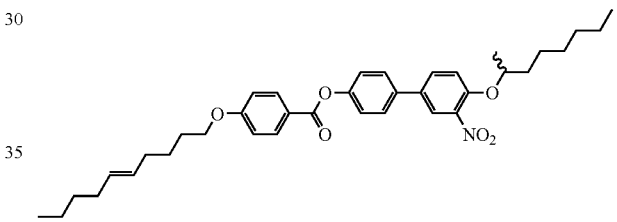

When doped with a chiral analyte, the achiral W435 has a chiral de Vries smectic A phase. Another example of a suitable achiral liquid crystal host material that forms a chiral deVries smectic A phase when doped with a chiral analyte is a racemic mixture of (S)-W399 and (R)-W399:

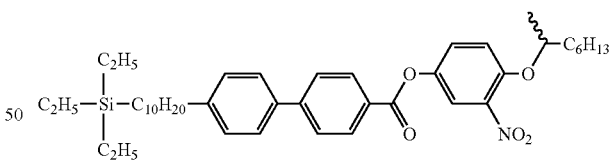

An additional example of a suitable achiral liquid crystal host material that forms a chiral deVries smectic A phase when doped with a chiral analyte is a racemic mixture of the following compound:

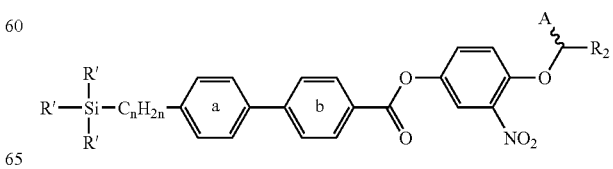

wherein A is F, —$CH_3$, —$C_2H_5$, —$CF_3$, or —$C_2F_5$ n is an integer ranging from 6-12;

R' is a small alkyl group having from 1-6 carbons, particularly —CH$_3$ or —C$_2$H$_5$;

R$_2$ is an alkyl, fluoroalkyl, ether or fluoroether; and the a and b rings may each be substituted with one or two F.

An additional example of a suitable achiral liquid crystal host material that forms a chiral de Vries smectic A phase when doped with a chiral analyte is a racemic mixture of the following compound:

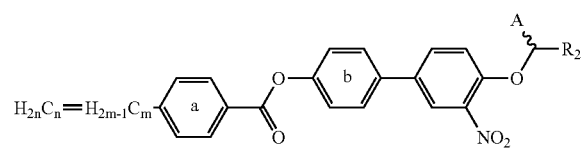

wherein A is F, —CH$_3$, —C$_2$H$_5$, —CF$_3$, or —C$_2$F$_5$ n and m are integers ranging from 1-12, particularly where n+m=6-12 and particularly where n=m;

R$_2$ is an alkyl, fluoroalkyl, ether or fluoroether; and the a and b rings may each be substituted with one or two F.

An additional example of a suitable achiral liquid crystal host material that forms a chiral de Vries smectic A phase when doped with a chiral analyte is the achiral compound 8/422 [Radcliffe, M. D.; Brostrom, M. L.; Epstein, K. A.; Rappaport, A. G.; Thomas, B. N.; Shao, R. F.; Clark, N. A. *Liq. Cryst.* 1999, 26, (6), 789-794.]. The compound 8/422 is representative of a large class of fluoroethers exhibiting de Vries behavior:

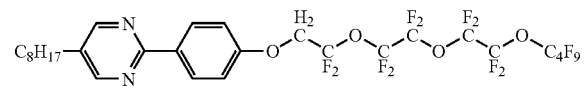

As described above, the dopant/host liquid crystal mixtures of the disclosure may be processed into an LC cell comprising a LC thin film between a pair of parallel solid substrates with means for obtaining bookshelf alignment of the liquid crystal (i.e. the LC director is parallel to the substrates with long range orientation of the director in the substrate plane, and the smectic layers are normal to the substrates) in order to determine a chiral electro-optic signature, such as electroclinic tilt in response to an applied electric field. One suitable substrate is Indium Tin Oxide (ITO) coated glass. At least one of the substrates may be coated with an alignment layer, such as PVA, polyimide, nylon, or other materials known in the art. At least one of the alignment layers may be rubbed. In the case where both of the alignment layers are rubbed, the rubbing direction of the top substrate may be parallel or antiparallel to the direction of the bottom substrate, or the substrates may be rubbed such that the easy axis of the top substrate forms a finite angle with the easy axis of the bottom substrate. In embodiments where the dopant/host mixture has a chiral de Vries smectic A phase, preferably only one of the substrates is rubbed. Alternatively, the rubbing direction on the two substrates may be crossed (i.e. not parallel or antiparallel) in such a way that optimum alignment quality is obtained. The gap between substrates is nominally thin and is preferably less than 5 μm, although wider gaps may be useful in some applications.

For measurement of electroclinic tilt, the liquid crystal cell may be placed in a standard polarized light microscope setup, preferably with means for heating and/or cooling the stage. The cell may be initially oriented to provide maximum difference in transmission of light between crossed polarizers as an alternating current electric field is applied to the substrates. The alternating current preferably has a square wave function as this allows lock-in detection of the transmitted light (for example, using a photodetector). For example, a square wave driven at 1 kHz where V=±10V may be used. The intensity of light driven through crossed polarizers is known in the art to vary as sin$^2 2\theta$ where θ is the angle between the optic axis of the sample and the polarizer. Preferably, the polarizer is vertical, the analyzer is horizontal, and the LC cell is oriented such that the difference between the intensity of the transmitted light for positive applied field (+V) and the intensity of the transmitted light for negative applied field (−V) is maximized. In some embodiments, maximum difference in transmitted light intensity occurs when the director is oriented at 22.5° from the vertical as switching between the two tilted states corresponds to rotation of the optic axis of a waveplate through 45°. The difference between the intensity of the transmitted light at +V and the intensity of the transmitted light at −V gives the chiral signal, hereinafter referred to as ΔI, which is a function of the ee of the chiral analyte dopant. A calibration curve empirically relating dopant ee to ΔI for the same dopant/host combination is then used to determine the ee of the chiral analyte.

In another aspect, the disclosure provides methods of determining the ee of a plurality of samples of a chiral analyte in parallel using an array of LC cells on a single substrate, in which individual LC cells in the LC cell array are physically separated from each other. Such an LC cell array is similar to an LC-based information display, where an array of display "pixels" behave as independent LC cells using spatially resolved electric driving fields. In the present case, the driving fields can be the same for all of the "pixels," but the composition of the LC in each "pixel" may be different. Specifically, each sample of the chiral analyte is doped into an achiral liquid crystal material, and a thin film of each resulting dopant/host liquid crystal mixture (which possesses a chiral liquid crystal phase) is processed into a unique LC cell on the LC cell array so that each LC cell in the LC cell array comprises a thin film of the chiral analyte dopant/host mixture in bookshelf alignment. The chiral electro-optics of each dopant/host mixture in the LC cell array may then be determined sequentially, or it may be determined simultaneously for a plurality of the LC cells, or it may be determined simultaneously for all of the LC cells in the LC cell array. For example, the entire LC cell array can be placed within standard polarization optics as described above, and then imaged onto a charge coupled device (CCD) or similar imaging device, or monitored with any other suitable photodetection device, as an alternating electric current is applied to the entire array. In this way, the transmitted light intensity at +V and −V can be determined, thereby revealing ΔI for each LC cell in the LC cell array, which in turn can be used to calculate the ee of each sample of the chiral analyte represented in the array.

The aforementioned multiplexed methods for the determination of ee of a plurality of samples of a chiral analyte using LC cell arrays are especially useful for the developmental of asymmetric catalysts. A library comprising a plurality of different asymmetric catalyst candidates—each catalyzing the formation of the same chiral analyte, but at differing ee—can be screened by first doping a sample of the chiral analyte produced by each catalyst into an achiral liquid crystal host material to form a plurality of dopant/host liquid crystal mixtures each possessing a chiral liquid crystal phase. Then, a thin film of each dopant/host liquid crystal mixture is processed into a different LC cell of the LC array so that each dopant/host liquid crystal mixture adopts bookshelf alignment. The ee of the chiral analyte in each sample can be rapidly determined as described above, allowing identification of catalysts that produce the chiral analyte with the desired ee.

In another aspect, the disclosure provides a system for the determination of ee of a plurality of samples of a chiral analyte. The system comprises an array of LC cells as described above in combination with control electronics for applying an alternating current electric field to the cells, and further in combination with an polarizing optical system and a photodetection system for measuring the change in intensity of transmitted light for the individual LC cells while an alternating current electric field is applied to the LC cells.

Arrays of LC cells that can be adapted for use in the methods and systems described herein, and methods for the fabrication of arrays of LC cells, are well known in the art. For example, commercially available SSFLC displays (such as ferroelectric liquid crystal on silicon (FLCOS) video microdisplays manufactured by Displaytech, Inc., Longmont, Colo.) routinely comprise a pair of parallel substrates (less than 1" diagonal) that are patterned to provide >$10^5$ LC cells (in this case the cells need not be physically separated), with each cell forming an individual pixel on the display. See Handschy et al Ferroelectrics 85: 279-289 (1988). A center spacing of about 7.6 µm between neighboring LC cells and a cell gap of about 1 µm is typical for such FLCOS microdisplays. Each FLCOS LC cell routinely comprises about 25 pg of LC material in a volume of about 25 µm$^3$. In preferred embodiments, a LC array of similar dimensions is used in the methods and systems described herein; however, it is to be understood that these dimensions are provided as examples only, and are not limiting in any manner. In order to process or incorporate the individual dopant/host liquid crystal mixtures into the array of LC cells, the individual dopant/host mixtures may be introduced onto one of the substrates (with appropriate alignment layer), using, for example, manual pipetting means or automated pipetting means, and then the second substrate (with the appropriate alignment layer) may be then placed over the first to form an LC cell array comprising tens, hundreds, thousands, or millions of individual cells, each comprising the dopant/host LC mixture with bookshelf orientation imposed by appropriate alignment layers. Unlike the aforementioned video displays, it is not a requirement that the voltage applied to individual cells is independently controlled. Application of an alternating current to all of the LC cells simultaneously allows the chiral electro-optics to be determined in parallel for each cell. Because there is no requirement for independent voltage control for the individual cells, the LC arrays of the present disclosure are in some key ways simpler to fabricate than those routinely employed in the video display art.

In embodiments in which arrays of LC cells are used to determine the ee of a plurality of samples of a chiral analyte, it is preferred that the dopant/host mixture has a de Vries smectic A* phase above the smectic C phase (or other optically titled smectic phase) and that the chiral electro-optic signature that is determined is electroclinic tilt produced by the electroclinic effect. In a de Vries smectic A* phase, the temperature dependence of the field-induced optic axis tilt is relatively small (in comparison to the non-de Vries case) over a wide temperature range above $T_{AC}$ (the SmA-SmC transition temperature) and the saturation tilt is typically relatively large. Because each dopant/host mixture in the array will likely have a slightly different $T_{AC}$ (because of the varying ee of the chiral analyte dopant, or for other reasons, for example the amount of dopant in each LC sample is expected to be slightly different due to weighing errors), this temperature independence allows one to determine the chiral signals for the entire array at a single absolute temperature.

EXAMPLES

The following examples are provided for illustrative purposes only and are not intended to limit the scope of the invention.

Example 1

Measurement of Enantiomeric Excess of (S)-Naproxen (S)-Naproxen, a popular non-steroidal anti-inflammatory drug, and an important target for asymmetric catalyst development, has the following structure:

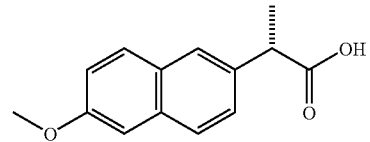

Four samples of naproxen were prepared using commercially available samples of the two naproxen enantiomers. Samples of 0%, 25%, 50%, and 75% ee (ee=% (S)— % (R)) were prepared (the sample with 0% ee was not a true racemate and the enantiomer present in small excess was not determined). The commercially available 100% ee (S) material was also evaluated. The samples were added (doped) to 1% by weight in the racemic W435 de Vries smectic A host. The resulting chirally doped de Vries smectic A liquid crystal material was filled into a commercial ITO/glass liquid crystal cell with a rubbed nylon alignment layer on one substrate and unrubbed nylon on the other substrate. As is typical for de Vries materials, the best alignment was obtained when only one of the substrates was rubbed, due to the surface electroclinic effect, which causes defects in the cell when both substrates are rubbed either parallel or antiparallel. The cell gap was about 3.1 µm (measured for each cell before filling) maintained by spacers added to the glue dots used to attach the two substrates.

The resulting transparent capacitor LC cells were then placed in a polarized light microscope setup using glass prisms as polarizers, with a temperature controlled stage. The cells were oriented to provide maximum difference in transmission of light between crossed polarizers upon application of electric fields of opposite sign. Maximum difference in transmission of light was observed when the SmA* optic axis at zero applied field (close to rubbing direction) was oriented 22.5° off the polarizer.

Figure 3A:
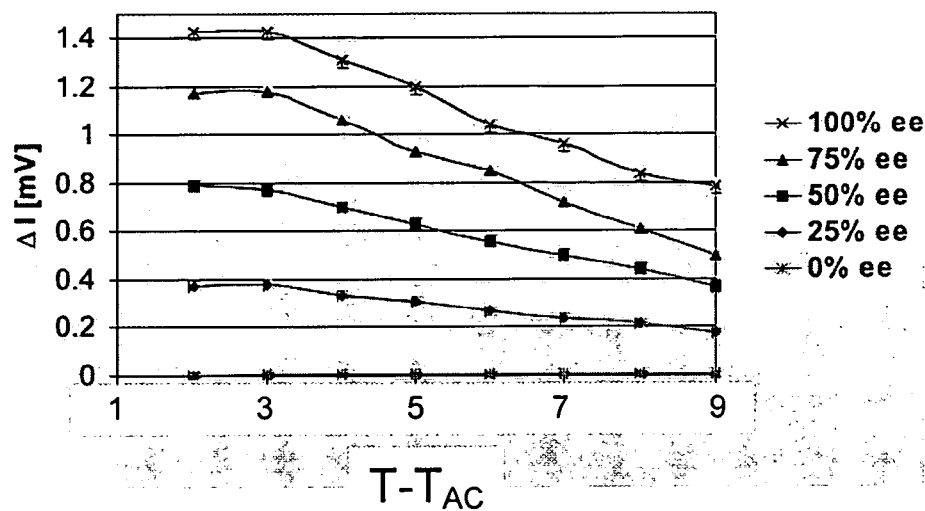
FIG. 3A depicts a plot of chiral signal ΔI (expressed as the difference between two voltage readings on a photo-multiplier) versus $T-T_{AC}$ (where T is absolute temperature, and $T_{AC}$ is the temperature of the SmA-SmC transition) for samples of the chiral drug naproxen at 0%, 25%, 50%, 75%, and 100% enantiomeric excess (% ee=% (S)−% (R)).

The transmitted intensity of 632 nm light from a He—Ne laser (spot size 20×20 µm) was measured using a photomultiplier as the cell was driven by a square wave driving voltage of V=±10V (±3.2V/µm) at 10 kHz. The chiral signal for each cell, ΔI (which is the difference in photo-multiplier response between application of +10V and −10V, expressed as a voltage on the photo-multiplier) was plotted as a function of $T-T_{AC}$. See FIG. 3A The chiral signal is relatively temperature independent, and strong (the signal to noise detection limit with this setup was about ($\Delta I \sim 1$ nV). The chirally doped de Vries smectic A material shows a very large electroclinic response ($\Delta I \sim 1.4$ mV for the pure enantiomer). The response is quite independent of temperature over a relatively large range.

Figure 3B:
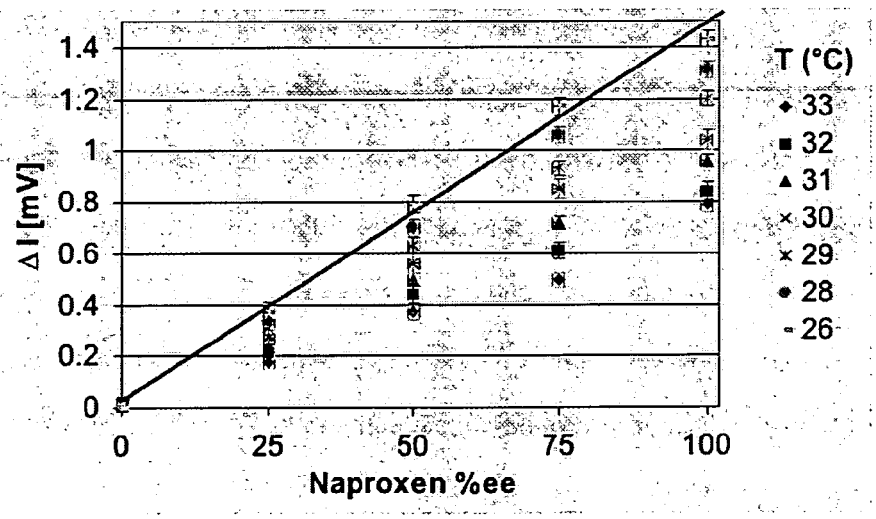
FIG. 3B depicts a plot of chiral signal ΔI (expressed as the difference between two voltage readings on a photo-multiplier) versus enantiomeric excess (expressed as % ee=% (S)−% (R)) for naproxen at varying absolute temperature.

Plots of the chiral signal vs. Naproxen ee at several absolute temperatures are given in FIG. 3B. In this case, while noise is introduced by the fact that $T_{AC}$ varies slightly for the five samples, linear curves are obtained over a wide temperature range. The strongest response is obtained at the lowest temperature measured, in this case 26° C. From the sample thickness, and the probe beam spot size, it can be calculated that the actual amount of naproxen giving rise to these signals is ~20 pg.

This example illustrates that the ee of an unknown sample of naproxen can be determined to about ±5% ee.

Example 2

Measurement of Enantiomeric Excess of Pseudoephidrine

The method of Example 1 was also applied to the chiral drug (R*, R*) pseudoephedrine. Specifically, pseudoephidrine samples of 0%, 25%, 50%, 75%, and 100% ee (ee=% (S,S)−% (R,R)) were doped into W435 host to a final concentration of 1% by weight of pseudoephidrine. The (S,S) enantiomer of pseudoephidrine has the following structure:

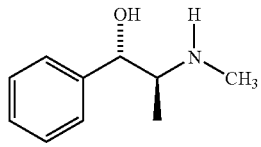

In formulating the mixtures of pseudoephedrine with W435 host, care was taken to avoid sublimation of the analyte from the isotropic phase of the liquid crystal during the formulation. In addition, the data was acquired quickly, since the pseudoephidrine phase-separated from the host over a period of hours.

Figure 4:
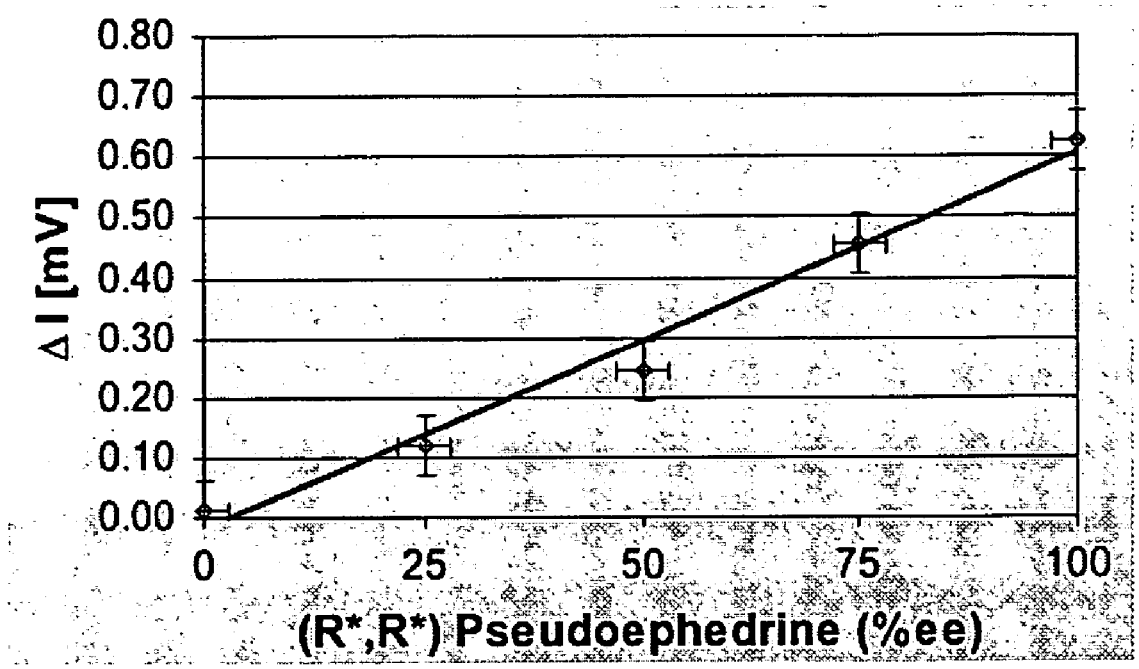
FIG. 4 depicts a plot of chiral signal ΔI (expressed as the difference between two voltage readings on a photo-multiplier) versus enantiomeric excess for pseudoephidrine samples (enantiomeric excess expressed as % ee=% (S,S)−% (R,R))

Measurements of $\Delta I$ were made at a temperature of 30° C. and using a cell driving voltage of $V=\pm 5.6 V/\mu m$. As can be seen in FIG. 4, the $\Delta I$ signal from (R*,R*) pseudoephedrine was smaller than that obtained with naproxen, even with a driving field 1.8 times larger. The signal to noise ratio was, however, quite large, and as for naproxen, this example illustrates that it is possible to measure ee on very small samples to ±5% ee at one absolute temperature.

What is claimed is:

1. A method for measuring the enantiomeric excess (ee) of a chiral analyte, the method comprising:
   a) doping an achiral liquid crystal host material with said chiral analyte to form a dopant/host liquid crystal mixture, wherein the dopant/host liquid crystal mixture possesses a chiral liquid crystal phase;
   b) determining a chiral electro-optic signature of said dopant/host liquid crystal mixture prior to phase separation of said dopant/host liquid crystal mixture; and
   c) comparing the chiral electro-optic signature of said dopant/host liquid crystal mixture with a calibration curve which empirically relates dopant enantiomeric excess to chiral electro-optic signature for the same dopant/host combination.

2. The method of claim 1 wherein the dopant/host liquid crystal mixture possesses a chiral smectic C liquid crystal phase.

3. The method of claim 1 wherein the dopant/host liquid crystal mixture possesses a chiral smectic A liquid crystal phase.

4. The method of claim 1 wherein the dopant/host liquid crystal mixture possesses a chiral de Vries smectic A liquid crystal phase.

5. The method of claim 1 wherein said achiral liquid crystal host material is a racemic mixture of enantiomers of a chiral liquid crystal compound.

6. The method of claim 1 wherein said achiral liquid crystal host material is racemic

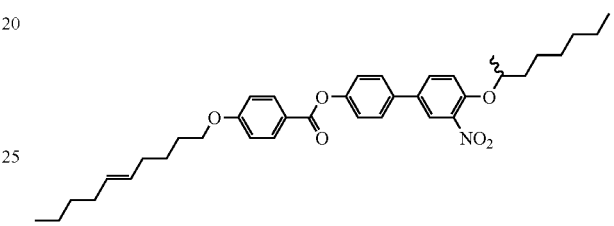

7. The method of claim 1 wherein the chiral electro-optic signature determined in step (b) is electro-optic risetime.

8. The method of claim 1 wherein the chiral electro-optic signature determined in step (b) is produced by the electroclinic effect.

9. The method of claim 1 wherein the dopant/host liquid crystal mixture possesses a chiral de Vries smectic A liquid crystal phase, and wherein the chiral electro-optic signature measured in step (b) is produced by the electroclinic effect.

10. The method of claim 1 wherein the chiral electro-optic signature is measured in step (b) by:
   i. introducing said dopant/host liquid crystal mixture into a liquid crystal cell comprised of a pair of parallel substrates to form a thin film of said dopant/host liquid crystal mixture, and aligning said dopant/host liquid crystal mixture wherein said dopant/host liquid crystal mixture adopts the bookshelf geometry;
   ii. placing said liquid crystal cell between crossed polarizers;
   iii. applying an alternating current to said liquid crystal cell; and
   iv. measuring the intensity of light passing through said crossed polarizers and said liquid crystal cell during the application of said alternating current, as a function of time.

11. The method of claim 1 wherein said chiral analyte comprises a chiral organic compound covalently linked to an achiral liquid crystal precursor.

12. A method for determining the enantiomeric excess (ee) of each of a plurality of samples of a chiral analyte, the method comprising:
   a) doping an achiral smectic A liquid crystal host material with each sample to form a plurality of dopant/host liquid crystal mixtures each possessing a chiral de Vries smectic A liquid crystal phase;
   b) introducing each said dopant/host liquid crystal mixture into a separate liquid crystal cell in a liquid crystal cell array to form a thin film of said dopant/host liquid crystal mixture, and aligning each said dopant/host liquid crystal mixture wherein each said dopant/host liquid crystal mixture adopts the bookshelf geometry;

c) placing said liquid crystal cell array between crossed polarizers;

d) applying an alternating current to said liquid crystal cell array wherein the electro clinic effect is produced in at least some of said dopant/host liquid crystal mixtures; and e) measuring the intensity of light passing through said crossed polarizers and through each said liquid crystal cell in the liquid crystal cell array during the application of said alternating current, as a function of time.

13. The method of claim 12 wherein said achiral liquid crystal host material is a racemic mixture of enantiomers of a chiral liquid crystal compound.

14. The method of claim 12 wherein said achiral liquid crystal host material is racemic

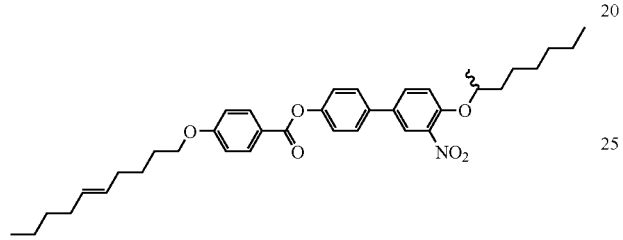

15. The method of claim 12 wherein each said sample of said chiral analyte is produced by an asymmetric catalyst.

16. A system for the determination of the enantiomeric excess (ee) of each of a plurality of samples of a chiral analyte, the system comprising:

a) a liquid crystal cell array comprised of a plurality of liquid crystal cells, wherein each liquid crystal cell is physically separated from every other liquid crystal cell and wherein each liquid crystal cell comprises a thin film of a dopant/host liquid crystal mixture having a chiral de Vries smectic A liquid crystal phase in bookshelf alignment, wherein said dopant comprises a chiral analyte and said host comprises an achiral liquid crystal material;

b) a polarizing optical system optically coupled to said liquid crystal cell array, said polarizing optical system comprising crossed polarizers and an illumination source incident upon said crossed polarizers and said liquid crystal cell array;

c) an electronic controller for applying alternating current to said liquid crystal cell array; and d) a photodetection system for measuring the intensity of light passing through said crossed polarizers and through each said liquid crystal cell in the liquid crystal cell array during the application of said alternating current.

17. The system of claim 16 wherein said achiral liquid crystal materia is racemic

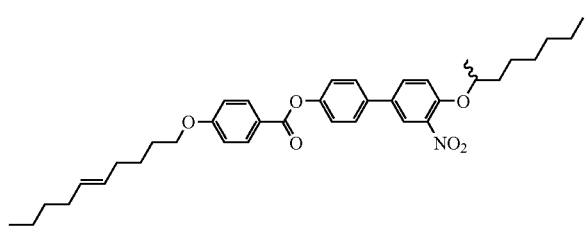

* * * * *